(12) United States Patent
Hartong et al.

(10) Patent No.: US 9,712,399 B2
(45) Date of Patent: Jul. 18, 2017

(54) COMPUTER NETWORK FOR SERVICES RETRIEVAL, METHOD FOR MANAGING SUCH NETWORK AND A COMPUTER SYSTEM FOR SUCH NETWORK

(71) Applicant: Clinct Holding B.V., Delft (NL)

(72) Inventors: Jasper Hartong, Delft (NL); Michel Antoine Boerrigter, Delft (NL)

(73) Assignee: Clinct Holding B.V., Delft (NL)

( * ) Notice: Subject to any disclaimer, the term of this patent is extended or adjusted under 35 U.S.C. 154(b) by 455 days.

(21) Appl. No.: 14/516,137

(22) Filed: Oct. 16, 2014

(65) Prior Publication Data
US 2015/0106495 A1    Apr. 16, 2015

Related U.S. Application Data

(63) Continuation of application No. PCT/NL2013/050272, filed on Apr. 16, 2013.

(30) Foreign Application Priority Data

Apr. 16, 2012 (NL) ...................................... 2008643

(51) Int. Cl.
*G06F 15/173* (2006.01)
*H04L 12/24* (2006.01)
(Continued)

(52) U.S. Cl.
CPC .......... *H04L 41/50* (2013.01); *G06F 21/6218* (2013.01); *G06Q 10/10* (2013.01);
(Continued)

(58) Field of Classification Search
USPC ....... 709/203, 206, 217, 219, 223, 224, 226, 709/228, 231, 232, 238; 726/4
See application file for complete search history.

(56) References Cited

U.S. PATENT DOCUMENTS 6,473,794 B1 * 10/2002 Guheen .................. H04L 41/22
709/224
6,615,166 B1 * 9/2003 Guheen .................. G06Q 10/06
709/231
(Continued)

FOREIGN PATENT DOCUMENTS

EP          1251436       10/2002
WO       2013/157938    10/2013

*Primary Examiner* — Quang N Nguyen
(74) *Attorney, Agent, or Firm* — Peacock Myers, P.C.; Jeffrey D. Myers

(57) ABSTRACT

The invention concerns a computer network for services retrieval consisting of one or more computer systems and one or more service providers. The computer system may comprise one or more clients. On the computer system one or more network accessible client tools are running. The client tools may be enriched with services. According to the invention the computer network comprises one or more subscription management components. The subscription management component manages and secures specific client tool related communications between the one or more computer systems and the one or more service providers. The invention also concerns a computer system for application in the computer network, as well as a method for managing the network.

11 Claims, 3 Drawing Sheets

(51) Int. Cl.
*G06Q 10/10* (2012.01)
*H04L 29/06* (2006.01)
*G06F 21/62* (2013.01)

(52) U.S. Cl.
CPC ....... *G06Q 10/109* (2013.01); *H04L 63/0407* (2013.01); *H04L 63/20* (2013.01); *H04L 67/42* (2013.01)

(56) References Cited

U.S. PATENT DOCUMENTS

| | | | |
|---|---|---|---|
| 7,315,826 B1* | 1/2008 | Guheen | G06F 17/3089 709/223 |
| 9,137,739 B2* | 9/2015 | Raleigh | G06Q 10/06375 |
| 2005/0144333 A1 | 6/2005 | Kotzin | |
| 2010/0024045 A1 | 1/2010 | Sastry et al. | |
| 2010/0076777 A1 | 3/2010 | Paretti et al. | |
| 2010/0077484 A1 | 3/2010 | Paretti et al. | |
| 2010/0082376 A1 | 4/2010 | Levitt | |
| 2010/0192207 A1* | 7/2010 | Raleigh | G06Q 10/06375 709/226 |
| 2010/0251339 A1* | 9/2010 | McAlister | H04L 63/104 726/4 |
| 2011/0084803 A1 | 4/2011 | Niemela et al. | |

* cited by examiner

COMPUTER NETWORK FOR SERVICES RETRIEVAL, METHOD FOR MANAGING SUCH NETWORK AND A COMPUTER SYSTEM FOR SUCH NETWORK

CROSS-REFERENCE TO RELATED APPLICATIONS

This application is a continuation of International Patent Application PCT/NL2013/050272, filed Apr. 16, 2013, which claims priority to Netherlands Patent Application with Ser. No. 2008643, filed Apr. 16, 2012, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The invention concerns a computer network for services retrieval consisting of one or more computer systems and one or more service providers, the computer system comprising one or more clients and one or more network accessible client tools running on the computer system, which client tools may be enriched with services. The invention also concerns a computer system for application in the computer network, as well as a method for managing the network.

Description of Related Art:

Computers systems are more and more applied in computer networks, in particular the internet. In such network, services may be provided by service providers or other computer systems. These services, which may be either pulled by the client tool and/or pushed by service providers or other computer systems, may enrich client tools running on the computer system. Such services may for instance be adding information, like (travel) planning and activities, to the client tool. As the internet is growing exponentially, also the number of services offered is growing, which increases complexity. Still the user of the client tool will require a fast and uncomplicated performance. Some of the services offered are for free, others have to be paid for. Most require some sort of registration and/or other input, in particular personal information. The user of the computer system will then, to a greater or lesser extent, loose anonymity and privacy and may have to provide sensitive personal information. In order to provide an optimal and continuous service, more and more service providers are designed such that and require that they are constantly active on the background and have access to large amounts of sensitive information on the computer system.

Such computer network is for instance known from US2010/0082376. Where the invention concerns computer networks and client tools in general, the known computer network of US2010/0082376 specifically concerns only a time management system, in particular a calendar application, running on a computer system. The known computer system is in the network connected to other computer systems and to an external tracking server. The external tracking server is connected by the network to one or more service providers that may suggest activities for an open time slot in the schedule of a user of the calendar application. The external tracking server searches for open time slots in the schedule of the user of the calendar, requests suggestions at external service providers, makes a selection and adds the selected suggestions to the calendar of the user. In addition several components may be added for receiving and processing preferences and location information of the user. Accordingly the external tracking server requires full access to the calendar. The personal information of the user, in particular the preferences and the location of the user are distributed over the network and outside the network. The user of the network has no control over the external tracking server. From a privacy point of view this is unacceptable. The known network may be provided with a security component for authorizing distribution of personal information of the user or for authorizing receipt of services. However, such opt-out or opt-in authorization requires each time a separate consent of the user, which makes the network slow and less dynamic.

Further EP1251436A2 recites a retrieval system including at least a retrieval server for serving retrieval service; and a retrieval device accessible through a transmission medium to the at least retrieval server.

The above document relates more to rewriting of retrieval variables from a user at the moment the user makes a request (making them less distinctive, for example passing along an area instead of the exact position of the user). It seems to act as an obfuscating gateway to different services. However, the system does not make the retrieval variables anonymous in any way, or decouples retrieval from an original user. With the system user approval e.g. incorporating user settings is not possible. The patent describes how to change a level of accuracy of a data request based on personal information.

US2011084803 (A1) recites a method and apparatus for controlling location information at a computer device such as a mobile telephone. Location information is intercepted and obtained by, for example, intercepting it from an Application Programming Interface destined for a location application. The location application is identified, and a rule is determined for applying to the location information on the basis of the identified location application. The rule is applied to the location information to give amended location information, and the amended location information is then sent to the location application.

US2010024045 A1 recites a method for accepting and enforcing user selectable privacy settings for context awareness including location awareness data on a computing platform. The method may identify a requestor, assign a privacy setting to the requester then detect a request for location information from the requestor. The method may transmit location information to the requester based on the user selected privacy setting. The user selected privacy setting may have a granularity assigned to each requestor based on a privacy preference and the method may entirely block the location information from being disclosed or the method may modify the granularity/accuracy of the location information based on the privacy setting to report context of an appropriate level of granularity according to the privacy setting configured by the user. Other embodiments are also disclosed.

US2005144333 A1 recites a presence attribute information server and manager application, and corresponding method for managing access to presence attribute information. In addition to the presence attribute information entries, access authorization entries associated with at least some of the presence attribute information entries are provided which define conditions in which access to the presence attribute information is authorized. Generally, the defined conditions can include temporal and/or spatial requirements associated with either the user requesting the presence attribute information or the person/item associated with the presence attribute information, for purposes of establishing authorization to access the presence attribute information.

US2010076777A1 recites a system and method that automatically provides users with recommendations regarding location tracking privacy policies that may be appropriate to enact in certain contexts as well as a means for enacting such policies. Once a privacy policy is enacted, the manner in which location information associated with the user is provided to at least one application or service will be controlled in accordance with the privacy policy. The recommended privacy policies may represent privacy policies that have been enacted by other users in like contexts.

US2010077484A1 recites a location tracking privacy engine is described herein that is configured to allow users to define privacy policies that govern how location information about each user is provided to context-aware applications and services. Privacy policies can be defined in a highly flexible and context-specific manner such that the execution of a given privacy policy by the location tracking privacy engine is dependent on the existence of one or more social, topical, temporal or spatial conditions. Privacy policies are then executed automatically by the location tracking privacy engine when the conditions associated with the policies are determined to be satisfied.

The six direct above documents recite systems wherein data is strongly tight to a user, such as by inherent coupling (in a database). Once coupled to a user, the data remains coupled over time, i.e. relating to a static system in this sense. The system controls data management to a large extend, and privacy of a user is limited and at jeopardy. A user may set or amend settings to some extent, but only at a superficial level.

The present invention therefore relates to a computer network for services retrieval, which overcomes one or more of the above disadvantages, without jeopardizing functionality and advantages.

BRIEF SUMMARY OF THE INVENTION

The present invention intends to solve one or more of the problems of the prior art described above, and it is in particular an objective of the invention to provide a computer network that offers a fast and dynamic access to a wide range of services and yet limits the distribution of proprietary information of a user or a group of users, such as a company. Preferably the network may be applied in combination with several network accessible client tools. As such privacy is maintained, secured and protected.

In the present invention an information (subscription) request is decoupled from actual user data (e.g. information requests can be proxied, which results in both efficiency—grouping of request—and privacy through obscurity). Also automatic retrieval of information based on temporal/spatial subscription rules is enabled, which increases users privacy (e.g. a user's location is only available during a trip, or an employer can only monitor a user's presence during working hours, a travel information provider can only monitor a user's location during a trip). Thus enhancing a user's privacy, while enabling real-time and dynamic context information services. The present invention, also referred to as Calendar42, allows the user to have full control over and insight into the usage of its whereabouts data and distribute this data (anonymously) to different supportive services initiated by the user itself (instead of initiated by an external service). Decoupling of data and user is established by the present invention, thereby making it (virtually) impossible to retrieve data, specifically as a one-to-one relation is lost between user and data. On the other hand the data remains available, e.g. as statistical data. A user is and remains in full control over a user's data, e.g. in that settings can be changed at any point in time. Typically a user initiates such control, optionally on request of the present network. The (combined) user data can be used to predict certain behaviour and the like, e.g. in order to plan in advance. Such planning can be updated virtually continuously. In a given context, e.g. travel requirements of user(s), a dynamic response e.g. in terms of planning can be provided. Even further, also rules for decision-making and the like can be introduced, as well as threshold values. For instance means (bus, train) for a trip may be cancelled or introduced, based on an expected number of users. As such a very flexible environment may be provided, e.g. in terms of location, time, number of users, extent of service, etc.

The computer network for services retrieval according to the invention is characterized by one or more of the appended claims.

In summary the present invention provides e.g. structuring of data, such as dynamic retrieval of information, data enrichment, monitoring on dynamic information requests, monitoring on dynamic information sources and matching (dynamic) information requests with (dynamic) information sources. It further allows execution of actions, such as trigger actions based on pre-defined thresholds (e.g. notifications, bookings, reservations, updates, actuators, etc.). As a result the present invention provides e.g. feature rich or focused (user) interfaces that enable e.g. full control of users' privacy, smart and dynamic information services, and monitoring of data consumption and requests in historic, actual and predictive manner. Such control may also relate to a rejection of user data to be provided, to e.g. a service, all together.

DETAILED DESCRIPTION OF THE INVENTION

In a first aspect of the invention the computer network comprises one or more subscription management components, which manage and secure specific client tool related communications between the one or more computer systems and the one or more service providers. The subscription management component provides an intelligent and secure interface between the computer system and the service providers. The service providers have no free access to the computer system and obtain only the information as far as required for their performance and in so far as the service as such is appreciated or requested by the computer system. The services offered by the service providers will be received and processed by the subscription management component and input on a computer system will only be made available when approved by the subscription management tool.

According to a further aspect of the invention the subscription management component is designed for real-time and/or continuous processing of communications, in particular changes in communication, and/or of communication conditions. In this way a continuous and fast subscription management is obtained with a high level of security. The subscription management component may instantly react on changes communicated by the client tool and/or by the services providers and manage the communication between the client tool and the one or more service providers in order to adjust the services in the client tool to the changes. Moreover, the subscription may continuous be monitored, adjusted and tuned by the user. This provides the user the possibility to modify the subscription (templates), such as in- or decreasing access conditions or revoking access to a specific service provider.

In the computer network of the invention, the computer system may include the subscription management component. In this way the subscription management component is under control of the owner and may be tuned to the requirement of that owner. Throughout the description an owner may be referred to as a user, the user making use of e.g. the present computer network or method and being owner of his/her characteristics. Such computer system may be a single client or a group of clients, for instance a sub-network such as a company network. When the single client includes the subscription management component, the client may be operated independently, which is in particular useful for mobile devices and for devices that are applied in different computer systems.

According to a further aspect of the invention the subscription management component is a remote server that connects one or more computer systems and/or one or more service providers. In such configuration of the network according to the invention, one or more computers systems and/or clients thereof may apply the same remote server, which server may be positioned at a distance in the network, in particular in the cloud.

In again another aspect of the invention the subscription management component consist of several servers, each server with distinction of function and/or with access to different types of information, such as user preferences, user location, users service history and group policies. In this way the functions of the subscription management component and/or the access to different information are fragmented over the several servers. Accordingly a service provider will be connected only to those servers of the subscription management component with functions and information that are necessary for the specific services of that service provider. For instance not all service providers will need to know the specific location of a user to render their services. The subscription management component will then deny any communication between the location server and the service provider. On the other hand a specific service provider may optimize its services and make them available instantly when allowing communication with the server of the subscription management component containing the users service (interaction) history. The several servers of the subscription management component may be interconnected, in particular with an account server or personal server.

In a further embodiment of the invention the subscription component is provided with an enrichment server. The enrichment server manages and secures all or part of the communication between one or more of the several servers of the subscription component and one or more service providers. The enrichment server, which may comprise several severs, provides an additional layer of security, in particular with respect to classified sensitive information. The enrichment servers will match internal with external information in order to supplement the internal information and will also be functioning as proxy.

According to a further aspect of the invention the subscription management component is adjustable. In this way the subscription management component may be set to a specific management and security level. Such setting may have distinction in detail dependent on the services to manage and security required. In particular the subscription management component is adjustable to one or more access levels. In this way a service provider may be assigned a certain access level on basis of the services rendered and the information required. Further, the invention provides the possibility that the access to the subscription management component is adjustable in respect of the extent of the information communicated. In this way the information flow to service provider in general may be restricted and may even be limited to the minimum necessary information. In particular the subscription management component of the invention is adjustable with respect to the communication with a specific service provider and/or a specific computer system, in particular with respect to the access level and/or the extent of specific information to be communicated. Such subscription management component may be tuned to a specific service provider or other computer systems in the network. The invention also provides a subscription management component that is self-adjusting in response to a specific service provider and/or a specific computer system. Such self-adjusting subscription management component may adjust its management and security level dependent on the specific client tool, the characteristics of the service provider and the services rendered. In general such self-adjustment will be based on a management and security policy that is captured in an algorithm. In this way intervention of a user of the client tool is limited and a dynamic subscription management is obtained. The subscription management component may comprise a classification module for classifying service providers and/or computer systems and may adjust itself on basis of such classification. All these aspects of the invention that concern the adjustability of the subscription management server provide the user the possibility to template subscriptions on different levels, for instance with respect to the level of detail of information or the accuracy of the information. In addition access to these templates may for instance be restricted by specific rules set by the user, such as restricting access to a specific timeslot or location (area). As a result, a subscription component used by different users for the same service provider may apply different subscription templates for each user and accordingly each user will have the services and information of that service provider customized. On the other hand, for instance within an intranet, such as the network of a company, templates for specific services may be standardized so that for the same service provider all users will obtain the same service.

The computer system to be applied in the computer network according to the invention may be a client provided with a subscription management component or may be a group of clients and one or more subscription management components. Such computer system facilitates building of a flexible network. Single clients with their own dedicated subscription management component may be connected to a random network. Thin clients without the need to have their own subscription management component may be connected in a computer system comprising a subscription management component. Such computer system may for instance be a sub-network of several clients, such as an intranet of a company. The company may then apply company policy for the subscription management of all client computers of the company that are connected to the network of the company.

According to again another aspect of the invention the computer system comprises a personal server at distance from one or more clients, the personal server comprising user information and being accessible for the subscription management component. This configuration facilitates so-called cloud computing with the one or more clients, the one or more subscription management components and the personal server connected to and positioned at distance from each other. A user may accordingly set up a computer system and apply the subscription management virtually from any location.

The method of the invention comprises the following steps:
- searching for relevant services and/or service providers in relation to a client tool running on a computer system of a computer network;
- determining and setting, initiated and fully controllable by an owner and thereby maintaining privacy, for the specific service and/or the service provider, the access level and/or the accessible information package and/or a push and/or pull configuration;
- communicating information from the computer system to the service provider;
- receiving services from the service provider; and
- adding the services to the client tool. As such details of a user become obscure and privacy of a user is secured.

SUMMARY OF FIGURES

The various aspects of the invention will now be described in more detail and will be elucidated, by way of example only, with reference to the accompanying drawing which shows in.

DETAILED DESCRIPTION OF FIGURES

Figure 1:
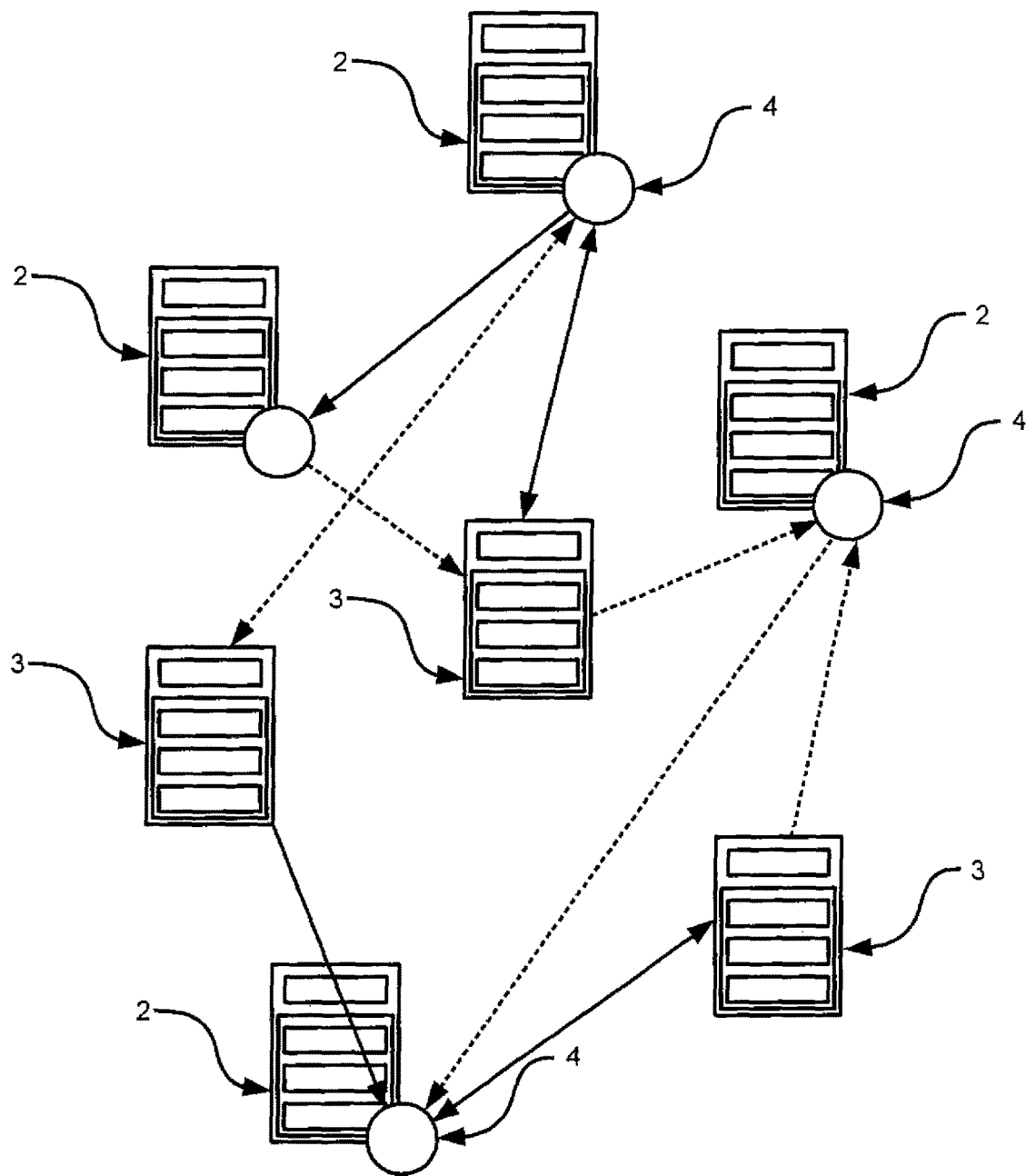
FIG. 1, an architecture of a network for service retrieval according to the invention.

FIG. 1 shows an architecture of a network according to the invention. The network 1 consists of several computer systems 2 and several service providers 3. Each computer system is provided with a subscription management component 4. A computer system 2 may be a single client or a group of clients and/or servers, such as a sub-network, for instance a company network. A client may for instance be a smartphone, a tablet, a notebook, a desktop computer or may reside in the cloud. On the computer systems and/or the clients the user may apply client tools. Such client tool may for instance be a calendar. The connections in the network and/or within the computer systems may be wired, wireless or a combination thereof. The connection may be direct or indirect via one or more servers (not shown here). In an internet environment in general several servers are involved. The network 1 may in particular also facilitate so-called cloud computing and also computer systems may consists of several components placed at distance from each other. The computer system 2 may in that case be a virtual network.

A computer system 2 may communicate with other computer systems 2 and service providers 3 in the network. In particular in an internet environment this provides access to a huge number of computer systems 2 and service providers 3 and accordingly comprehensive information and services. This information and these services, which may be either pulled by the client tool and/or pushed by service providers 3 or other computer systems 2, may enrich client tools running on the computer system 2. Pushing and/or pulling may, for instance, be part of or combined with polling operations of the client tools running on the computer system 2 or polling operation of the subscription management components 4 or polling operations of service providers 3. Such services may for instance be adding information, like (travel) planning and activities, to a client tool. As the internet is growing exponentially, also the number of services offered is growing, which increases complexity. Still the user of the client tool will require a fast and uncomplicated performance. Moreover, the user of the computer system will require instantly and without substantial personal intervention, preferably automated, access to information and services. Some of the services offered are for free, others have to be paid for. Most require some sort of registration and/or other input, in particular personal information. The user of the computer system 2 will then, to a greater or lesser extent, loose anonymity and may have to provide sensitive personal information. In order to provide an optimal and continuous service, more and more service providers 3 are designed such that and require that they are constantly active on the background and have access to large amounts of sensitive information on the computer system.

Figure 2:
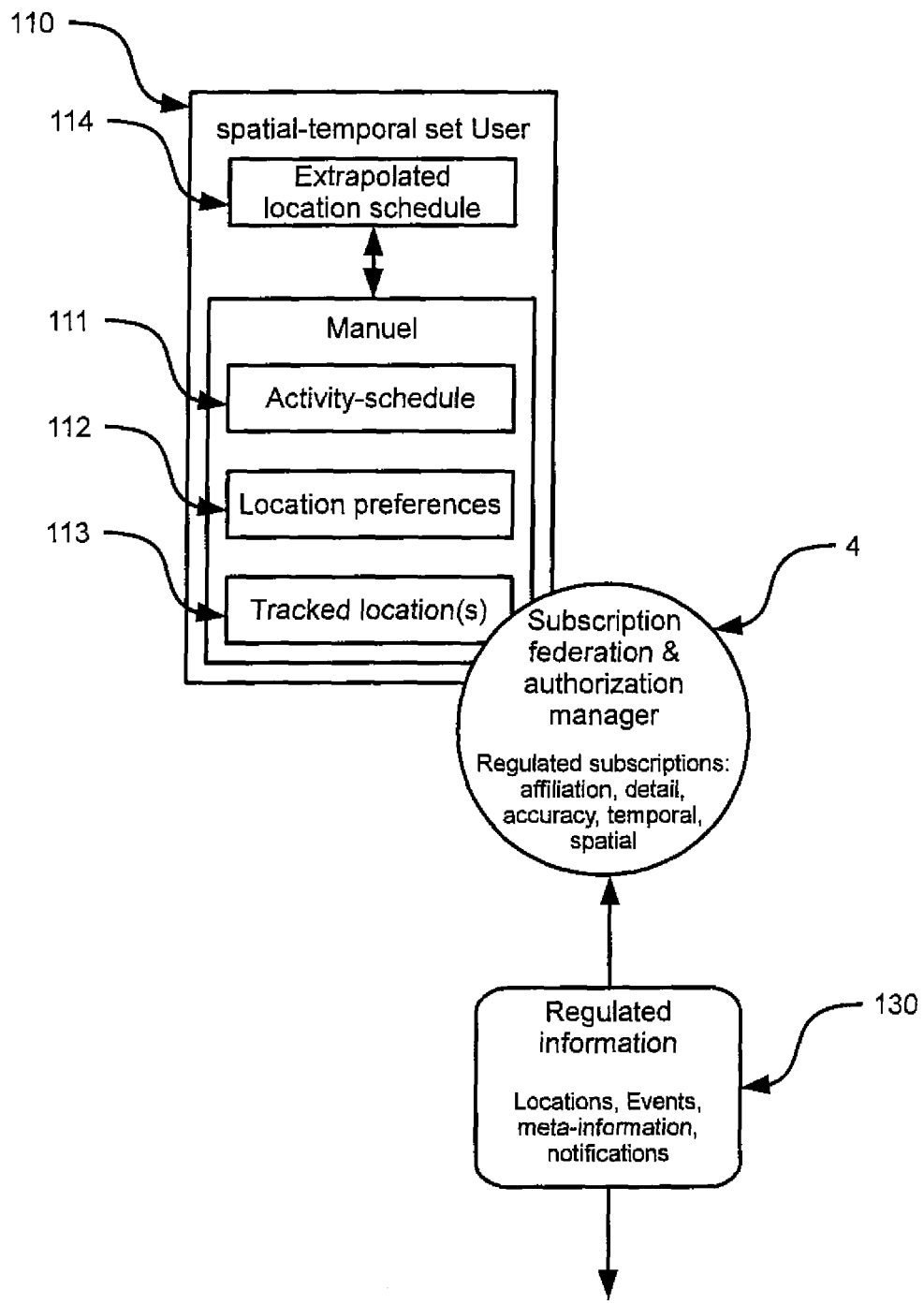
FIG. 2, a subscription management system according to the invention.

The subscription management component 3 of FIG. 1 is designed for real time secured subscription management. The management is automated and only in exceptional cases the subscription management component 4 will require intervention by the user of the computer system 2. The arrows in FIG. 2 represent some of the possible information flows in the network. The computer systems 2 share information and receive information and/or services in order to enrich the client tools running on the computer system 2. Service providers 3 receive information and return information or services. In particular also groups of users within a computer system or a sub-network, may share information or services.

Mutual communication between the computer systems 2 and communication between the computer systems 2 and the several service providers 3 is managed and secured by the subscription management component 4. The subscription management component 4 is adjustable. In this way the subscription management component 4 may be set to one or more specific management and security levels. Such setting may have distinction in detail dependent on the services to manage and the required security. In particular the subscription management component 4 is adjustable to one or more access levels. In this way a service provider may be assigned a certain access level on basis of the services rendered and the information required. Further, the invention provides the possibility that the access to the subscription management component 4 is adjustable in respect of the extent of the information communicated. In this way the information flow to service providers 3 may be restricted and may be limited to the minimum necessary information. In particular the subscription management component 4 is adjustable with respect to the communication with a specific service provider and/or a specific computer system, in particular with respect to the access level and/or the extent of specific information to be communicated. The subscription management component 3 is self-adjusting in response to a specific service provider and/or a specific computer system. In cases where the subscription management component 4 is not able to determine the access level and/or the extent of information to release for a certain computer system 2 or certain service provider 3, the subscription management component 3 will ask the user for instructions. Such self-adjusting subscription management component 4 may adjust its management and security level for instance dependent on the specific client tool, the characteristics of the service provider and the services rendered. In general such self-adjustment will be based on a management and security policies that are captured in one or more algorithms. The subscription management component 4 comprises a classification module for classifying service providers and/or computer systems and adjusting itself for communication with a specific service provider and/or a specific computer system, in particular with respect to the access level and/or the extent of specific information to be communicated. In this way intervention of a user of the client tool is limited and a dynamic real time subscription management is obtained.

In FIG. 2 the subscription management component 4 is shown in further detail. The subscription management component 4 is connected to a user specific information source 110 of a client tool. In this specific case the client tool is a computer implemented calendar. Typically such calendar tool comprises or has access to a spatial-temporal information set of the user, such as activities 111 and location 112. This may include as well preferences and history, such as home and work location. Such tool may also track the actual location 113 of the user. Within such tool the tracked location may for instance trigger a warning when the actual combination of time and location and the next scheduled activity and location, require instant departure or may trigger a warning that arrival in time is not possible and rescheduling is advisable. The information will in general be entered automatically by a tracking device, such as a GPS or GSM system, or will be entered manually. The user of the calendar tool may be interested in services, suggestions and other information that may enrich the calendar. All entered information is however personal and possibly confidential and a user will want to avoid that such information is freely distributed over the network or that the network has free access to the calendar. The subscription management component 4 manages and secures the communication between the information source 110 of the client tool and the network and only the regulated information 130 will be exchanged. Moreover, the same user will probably apply several client tools at the computer system 2. The subscription management component is able to manage and secure communication between all these client tools in the network 1. Accordingly, it is not necessary to have each client tool equipped with a security component. This prevents sprawl of security components within the computer system 1 of which security components the function and protection are difficult to set and in particular difficult to assess by the user. The present subscription management component 4 is universal, easy to set and easy to understand. Communication between the client tool and the network 1 may be on a push and/or on a pull basis. From a security point of view, communication on pull basis is in its nature easier to control than on a push basis. Setting of access levels and accessible information will therefore in general be more strict for pushing than pulling. Accordingly the subscription management component 4 enables pushing service providers 3, however prevents that the pushing service providers 3 track changes directly in the computer system 2. The subscription management component 4 provides information as far as required for the service provider to perform. The information provided to a specific service provider 3 may even become more detailed dependent on circumstances. For instance for the calendar application the information provided may become more detailed nearing a timeslot, nearing a destination or after prolonged usage, in order to bring also the service provider 3 in position to provide more detailed information or services to the client tool.

Figure 3:
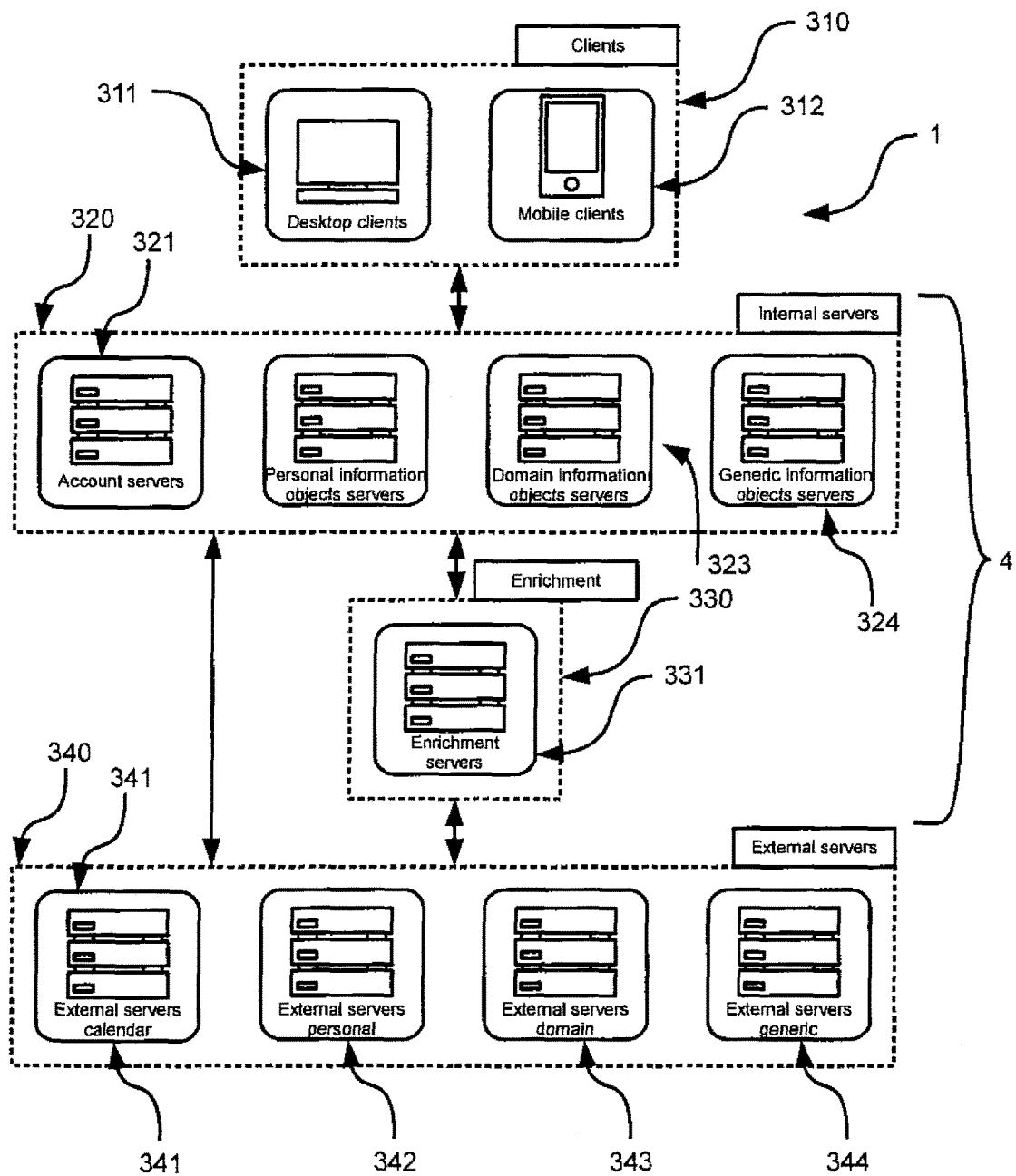
FIG. 3, architecture of a network according to the invention with a subscription management system comprising several servers.

In FIG. 3 a further embodiment of the architecture of a network 1 according to the invention is shown. The subscription management component 4 is connected with a computer system 310 consisting of several thin clients, such as mobile clients 312 and desktop clients 311. The subscription management component 4 of this embodiment consists of a structure of internal servers 320 and a structure of enrichment servers 330. The structure of internal servers 320 comprises several internal (virtual) servers: account server 321, personal information objects server 322, domain information objects server 323 and generic information objects server 324. The structure of internal servers 320 is connected to the structure of external servers 340, either by a direct connection or indirect by the structure of enrichment servers 330. The structure of enrichment servers 330 with the enrichment server 331 thereof provides an additional layer of security, in particular with respect to classified sensitive information. The enrichment servers will match internal with external information and will also be functioning as proxy. Each of the internal servers 322, 323 and 324 has a distinct function and is connected with the other internal servers, such as account server 321. The account server provides the servers 322, 323 and 324 with the specific information they require for their specific function, in particular user preferences, user location, user's service history and group policies. In this way the function of the subscription management component and/or the access to specific information are fragmented over the several servers. Accordingly external service providers 341, 342, 343 and 344 as part of the structure of external servers 340 will be connected, directly or indirectly, only to those servers of the subscription management component 4 that are relevant for the specific services of that service provider. For instance not all service providers will need to know the specific location of an user to render their services. The subscription management component 4 will then deny any communication between the domain server 323 and such service provider, however will allow communication between the domain server 323 of subscription management component 4 and the external domain information service provider 343.

The subscription management component 4 may for instance also comprise account history with respect to certain service providers. When such history is made available to one or more of the external servers 342, 343 or 344 the mentioned service provider may optimize its services and may start its operation immediately.

The shown architecture of network 1 may be wired, wireless or a combination thereof. Components of the architecture may be at distance from each other. This configuration facilitates so-called cloud computing with the one or more clients 311 and 312 of computer system 310, the subscription management component 4, with the structure of internal servers 320 and the structure of enrichment servers 330, and the structure of external servers 340, connected to and positioned at distance from each other. Also the servers of the several structures of servers may be connected and positioned at distance from each other. A user may accordingly set up a computer system and apply the subscription management component and the method according to the invention virtually from any location.

EXAMPLES

In addition to the technology described above the following examples illustrate advantages of the present invention.

Example Case 1

Ad hoc HR Planning

Due to budget cuts, hospitals may be required to become more efficient in usage of their resources. Such may result in a decrease in fixed staff and an increase in freelancers or independent contractors. To avoid a talent drain, several hospitals have started a cooperation to share these employees. The cooperation between these hospitals is managed by a virtual marketplace, which supports the process of medium- to long-term assignments. So called 'ad-hoc' assignments in the hospitals were not in scope of this hospital system. However, a sudden and immediate need for extra personnel (e.g. due to illness, sudden unexpected increase in patients etc.) is common practice in hospitals. To support this ad-hoc process Calendar42 developed a new flexible ad hoc planning service. A solution that gives instant and real-time answers to questions like: "A nurse just called in sick. Who is available & capable to assist on her operation this afternoon?" combined with executing a required action of approaching, confirming and planning a candidate in. Hereby efficiency for the hospitals by reducing the time spent by a central flex agency is improved, by an increased usage of available labour capacity, increased satisfaction for operational managers and an increased insight and quality of management information. At the same time employees remain in full control of their availability and personal information.

Example Case 2

Dynamic Crew Planning

Crew planning disruptions are typically ad-hoc and affect both interests of an airline and operating crew. Current developments in the aviation industry (EU regulation on delay refunds) increase the need for a dynamic and more efficient crew planning solution. Calendar42 provides such a solution. Calendar42 provides integration of real-time operations data (i.e. fleet availability) with crew availability data (i.e. crew schedules and real-time traffic/public transportation data), thereby decreasing the impact of ad-hoc planning problems (avoid deployment of emergency crews, reduce delayed flights, etc.) by automation and introducing real-time management information (avoid ad-hoc planning problems up front, increase efficiency). A crew plan integrated with personal schedules and real-time updates regarding changes in schedule, delays, traffic, public transport, etc. while maintaining and securing the crew members privacy.

Example Case 3

Public Transport

Government based initiatives and the decrease in revenue for public transport operators due to decreased concession budgets, increasing fuel price and general budget cuts stimulate investment in services that improve accessibility of public transport, enable value chain optimisation and open up new business models (e.g. narrowcasting). An important aspect of increasing accessibility in public transport is advanced, and more specific, real-time travel information. Real-time travel information contains static plans (original schedule), actual information (dynamic changes like delays) and a monitoring component on this data. In order to monitor travel information both the actual data on the information source (dynamic delays) as the original information request (the travel information request) need to be monitored. Changes at one side are reflected on a change on the other side. With the technology of Calendar42 the monitoring of the information request is based upon the actual individual plans of travellers without intruding the privacy of this traveller. An important side effect is that this information contains valuable management information for the data source (public transport operators have real-time insight in historic, actual and future information requests) again without harnessing the users privacy.

Example Case 4

Hour and Trip declaration

With an increased quality of information in a person's calendar the calendar can be considered as an actual representation of the activities of its owner. This data can be used for analysis and registration purposes for example in a case of creating hour-based invoices at a consultancy firm. Instead of spending a lot of time on manually entering worked hours and travelled distances in a project management solution the actual planning of an employee is used as an automated and real-time information source. Hereby increasing efficiency by saving overhead time, adding the ability to monitor and validate activity without harnessing the employees' privacy and ultimately enabling real-time management information.

Example Case 5

Event Suggestions and Recommendations

Context aware declaration of information requests can be considered direct (e.g. "I need travel information to my next meeting") or indirect (e.g. "I do not want to miss out of any of the action in my hometown"). By combining different context factors (time, place, planning, profile, preferences, action/to do lists, social connections, etc.) with (commercial) event services (concerts, flights, discount deal, etc.) users can be proactively served in their information needs. Broadcast messages with commercial offers are considered to be adds or spam. Users all learned to ignore ads and to hate spam. Personalized messages suiting an individual's exact needs are considered to be generous offers. In order to make this distinction access to personal data is required. However people nowadays are, and in the opinion of inventors should be, reluctant by sharing their personal information with the rest of the world. By decoupling the information request from the present user's data Calendar42 technology is able to bridge this gap.

Example Case 6

House Automation Integration

An increased need for sustainable and energy efficient solutions combined with the continuous innovation off sensor technology results a rapid adoption off home automation (lighting, security, thermostats, locks, home entertainment, etc.) These household activities are often network connected and require threshold depending actions. For example a thermostat can initiate based on a temperature change, but also based on the estimated first arrival of a family member at home. Integrating real-time personal planning with home automation without conflicting the end users privacy is provided by the present invention.

To the person skilled in art it is obvious that the above given embodiments represent only a few of the many possible variations in which the network according to the invention may be embodied. Therefore the embodiments given here must be understood as an elucidation to the appended claims without limiting the scope of the invention. Within the protective scope numerous variations are conceivable.

What is claimed is:

1. A computer network for services retrieval comprising:
   one or more computer systems and one or more service providers, the computer system comprising one or more clients and one or more network accessible client tools running on the computer system, the network accessible client tools are enriched with services,
   wherein the computer network comprises one or more subscription management components, the subscription management components, designed to be initiated and to be fully controllable by an owner and thereby maintaining privacy, manage and secure specific client tool related communications between the one or more computer systems and the one or more service providers;
   wherein the one or more subscription management components consist of several servers, each server with distinction of function and/or with access to specific information;
   wherein the one or more subscription management components are provided with an enrichment server and that the enrichment server manages and secures all or part of the communication between one or more of the several servers of the one or more subscription management components and the one or more service providers;
   wherein the enrichment servers match internal with external information;
   wherein the subscription management component is adjustable, preferably adjustable to one or more access levels; and
   wherein the subscription management component comprises a classification module for classifying service providers and/or computer systems and adjusting itself for communication with a specific service provider and/or a specific computer system, in particular with respect to the access level and/or the extent of specific information to be communicated, and/or comprising a decoupling component wherein information (subscription) request is decoupled from actual user data, and/or comprising a means for making a user anonymous, such as Calendar42.

2. A computer network according to claim 1, wherein the subscription management component is designed for real-time and/or continuous processing of communications, in particular of changes in communication, and/or of communication conditions, such as for planning.

3. A computer network according to claim 1, wherein the computer system includes the subscription management component, and/or the client includes the subscription management component.

4. A computer network according to claim 1, wherein the subscription management component is a remote server that connects one or more computer systems and/or one or more service providers.

5. A computer network according to claim 1, wherein the access to the subscription management component is adjustable, preferably adjustable to one or more access levels.

6. A computer network according to claim 1, wherein the subscription management component is adjustable with respect to the communication with a specific service provider and/or a specific computer system, in particular with respect to the access level and/or the extent of specific information to be communicated.

7. A computer network according to claim 1, wherein the subscription management component is self-adjusting in response to a specific service provider and/or to a specific computer system.

8. A computer system for a computer network according to claim 1, wherein the computer system is a client provided with one or more subscription management components.

9. A computer system according to claim 8, wherein the computer system consists of a group of clients and one or more subscription management components.

10. A computer system according to claim 8, wherein the computer system comprises a personal server at distance from one or more clients, the personal server comprising user information and being accessible for the subscription management component.

11. Method for managing the computer network according to claim 1, comprising:
    searching for relevant services and/or service providers in relation to a client tool running on a computer system of a computer network;
    determining and setting, initiated and fully controllable by an owner and thereby maintaining privacy, for the specific service and/or the service provider, the access level and/or the accessible information package and/or a push and/or pull configuration;
    receiving services from the service provider; and
    adding the services to the client tool.

* * * * *